US009083066B2

(12) United States Patent
Ketkar et al.

(10) Patent No.: US 9,083,066 B2
(45) Date of Patent: Jul. 14, 2015

(54) BATTERY SYSTEM AND METHOD FOR COOLING A BATTERY CELL ASSEMBLY

(71) Applicants: Satish Ketkar, Troy, MI (US); Robert Merriman, Shelby Township, MI (US); Michael Nielson, Royal Oak, MI (US); Igor Isayev, Farmington Hills, MI (US)

(72) Inventors: Satish Ketkar, Troy, MI (US); Robert Merriman, Shelby Township, MI (US); Michael Nielson, Royal Oak, MI (US); Igor Isayev, Farmington Hills, MI (US)

(73) Assignee: LG Chem, Ltd., Seoul (KR)

( * ) Notice: Subject to any disclaimer, the term of this patent is extended or adjusted under 35 U.S.C. 154(b) by 239 days.

(21) Appl. No.: 13/686,018

(22) Filed: Nov. 27, 2012

(65) Prior Publication Data

US 2014/0147709 A1    May 29, 2014

(51) Int. Cl.
| | |
|---|---|
| H01M 10/50 | (2006.01) |
| H01M 10/6569 | (2014.01) |
| F25B 1/00 | (2006.01) |
| H01M 10/613 | (2014.01) |
| H01M 10/6557 | (2014.01) |

(52) U.S. Cl.
CPC ............. *H01M 10/5079* (2013.01); *F25B 1/00* (2013.01); *H01M 10/5004* (2013.01); *H01M 10/5059* (2013.01); *H01M 10/613* (2015.04); *H01M 10/6557* (2015.04); *H01M 10/6569* (2015.04); *F25B 2600/111* (2013.01); *F25B 2700/2117* (2013.01)

(58) Field of Classification Search
CPC ..................... H01M 10/5059; H01M 10/5077; H01M 10/5079
USPC .......................................................... 429/120
See application file for complete search history.

(56) References Cited

U.S. PATENT DOCUMENTS

| | | | |
|---|---|---|---|
| 1,587,425 | A | 6/1926 | Schepp |
| 2,273,244 | A | 2/1942 | Cornelius |
| 2,391,859 | A | 1/1946 | Earl |
| 3,503,558 | A | 3/1970 | Galiulo et al. |
| 3,522,100 | A | 7/1970 | Lindstrom |
| 3,550,681 | A | 12/1970 | Stier et al. |
| 3,964,930 | A | 6/1976 | Reiser |
| 4,009,752 | A | 3/1977 | Wilson |
| 4,063,590 | A | 12/1977 | Mcconnell |

(Continued)

FOREIGN PATENT DOCUMENTS

| | | |
|---|---|---|
| DE | 19639115 A | 3/1998 |
| EP | 1577966 A | 9/2005 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Jonathan G Leong
(74) *Attorney, Agent, or Firm* — Buckert Patent & Trademark Law Firm, PC; John F. Buckert

(57) ABSTRACT

A battery system having first and second battery cells and a cooling fin disposed between the first and second battery cells is provided. The cooling fin receives heat energy from the first and second battery cells and transitions a two-phase refrigerant into a gaseous refrigerant within an internal flow path. The compressor pumps the gaseous refrigerant into a condenser. The condenser transitions the gaseous refrigerant into the liquid refrigerant by extracting heat energy from the gaseous refrigerant.

7 Claims, 8 Drawing Sheets

(56) References Cited

U.S. PATENT DOCUMENTS

| | | |
|---|---|---|
| 4,298,904 A | 11/1981 | Koenig |
| 4,305,456 A | 12/1981 | Mueller et al. |
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Horstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,124 B2 | 11/2006 | Garthwaite |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 | 2/2011 | Yoon et al. |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0086201 A1 | 7/2002 | Payen et al. |
| 2002/0182493 A1 | 12/2002 | Ovshinsky et al. |
| 2003/0080714 A1 | 5/2003 | Inoue et al. |
| 2003/0189104 A1* | 10/2003 | Watanabe et al. ........... 236/92 B |
| 2003/0211384 A1 | 11/2003 | Hamada et al. |
| 2004/0069474 A1 | 4/2004 | Wu et al. |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0155680 A1 | 6/2009 | Maguire et al. |
| 2009/0186265 A1 | 7/2009 | Koetting et al. |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |
| 2011/0189523 A1 | 8/2011 | Eom |
| 2011/0293982 A1 | 12/2011 | Martz et al. |
| 2011/0293983 A1 | 12/2011 | Oury et al. |
| 2012/0082880 A1 | 4/2012 | Koetting et al. |
| 2012/0171543 A1 | 7/2012 | Hirsch et al. |
| 2013/0045410 A1* | 2/2013 | Yang et al. .................... 429/120 |
| 2013/0136136 A1 | 5/2013 | Ando et al. |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |
| 2014/0308558 A1 | 10/2014 | Merriman et al. |
| 2015/0010801 A1 | 1/2015 | Arena et al. |

FOREIGN PATENT DOCUMENTS

| | | |
|---|---|---|
| EP | 1852925 A | 11/2007 |
| EP | 2262048 A | 12/2010 |
| GB | 481891 A | 3/1938 |
| JP | 08111244 | 4/1996 |

(56) References Cited

FOREIGN PATENT DOCUMENTS

| | | |
|---|---|---|
| JP | 09129213 | 5/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006139928 A | 6/2006 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 20100119497 A | 9/2010 |
| KR | 20100119498 A | 9/2010 |
| KR | 1020110013270 A | 2/2011 |
| KR | 20110013269 A | 9/2011 |
| KR | 20110126764 A | 11/2011 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | WO 2011145830 A2 * | 11/2011 |

OTHER PUBLICATIONS

International Search Report; International Application No. PCT/KR2009/000258; International Filing Date: Jan. 16, 2009; Date of Mailing: Aug. 28, 2009; 2 pages.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: June 25, 2009; Date of Mailing: Feb. 3, 2010; 2 pages.
International Search Report; International Application No. PCT/KR2009/003434; International Filing Date: June 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.
Thomas J. Gadawski et al., pending U.S. Appl. No. 13/433,649 entitled "Battery System and Method for Cooling the Battery System," filed Mar. 29, 2012.
U.S. Appl. No. 13/475,963, filed May 19, 2012 entitled Battery Cell Assembly and Method for Manufacturing a Cooling Fin for the Battery Cell Assembly.
U.S. Appl. No. 13/586,960, filed Aug. 16, 2012 entitled Battery Module.
U.S. Appl. No. 13/587,030, filed Aug. 16, 2012 entitled Battery Module and Method for Assembling the Battery Module.
International Search Report for International application No. PCT/KR2013/004015 dated Sep. 26, 2013.
U.S. Appl. No. 14/059,547, filed Oct. 22, 2013 entitled Battery Cell Assembly.
U.S. Appl. No. 14/161,806, filed Jan. 23, 2014 entitled Battery Cell Assembly and Method for Coupling a Cooling Fin to First and Second Cooling Manifolds.
U.S. Appl. No. 14/273,572, filed May 9, 2014 entitled Battery Pack and Method of Assembling the Battery Pack.
U.S. Appl. No. 14/273,586, filed May 9, 2014 entitled Battery Module and Method of Assembling the Battery Module.
U.S. Appl. No. 14/328,000, filed Jul. 10, 2014 entitled Battery Systems and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/516,667, filed Oct. 17, 2014 entitled Battery Cell Assembly.
U.S. Appl. No. 14/531,696, filed Nov. 3, 2014 entitled Battery Pack.
Written Opinion for International application No. PCT/KR2014/002090 dated May 26, 2014.

* cited by examiner

BATTERY SYSTEM AND METHOD FOR COOLING A BATTERY CELL ASSEMBLY

BACKGROUND

The inventor herein has recognized a need for an improved battery system and method for cooling a battery cell assembly that utilizes a cooling fin between battery cells and transitions a two-phase refrigerant to a gaseous refrigerant to cool the battery cells.

SUMMARY

A battery system in accordance with an exemplary embodiment is provided. The battery system includes a battery cell assembly having first and second battery cells and a cooling fin disposed between the first and second battery cells. The cooling fin has an inlet port, an outlet port, and an internal flow path disposed between the inlet port and the outlet port. The cooling fin is configured to receive a two-phase refrigerant in the inlet port. The cooling fin is further configured to receive heat energy from the first and second battery cells and to transition the two-phase refrigerant into a gaseous refrigerant within the internal flow path utilizing the heat energy. The battery system further includes a compressor fluidly coupled to the outlet port and configured to pump the gaseous refrigerant into a condenser. The condenser is fluidly coupled to the compressor and is configured to receive the gaseous refrigerant from the compressor. The condenser is further configured to transition the gaseous refrigerant into a liquid refrigerant by extracting heat energy from the gaseous refrigerant. The battery system further includes an expansion valve fluidly coupled between the condenser and the inlet port of the cooling fin. The expansion valve is configured to receive the liquid refrigerant from the condenser and to decrease a pressure level of the liquid refrigerant to obtain the two-phase refrigerant. The two-phase refrigerant is routed from the expansion valve to the inlet port of the cooling fin.

A method for cooling a battery cell assembly in accordance with another exemplary embodiment is provided. The battery cell assembly has first and second battery cells and a cooling fin disposed between the first and second battery cells. The cooling fin has an inlet port, an outlet port, and an internal flow path disposed between the inlet port and the outlet port. The method includes receiving a two-phase refrigerant in the inlet port of the cooling fin. The method further includes receiving heat energy in the cooling fin from the first and second battery cells disposed on opposite sides of the cooling fin and transitioning the two-phase refrigerant into a gaseous refrigerant within the internal flow path of the cooling fin utilizing the heat energy. The method further includes routing the gaseous refrigerant from the outlet port to a compressor. The method further includes pumping the gaseous refrigerant from the compressor to a condenser utilizing the compressor. The method further includes transitioning the gaseous refrigerant received by the condenser into a liquid refrigerant by extracting heat energy from the gaseous refrigerant utilizing the condenser. The method further includes pumping the liquid refrigerant from the condenser to an expansion valve and decreasing a pressure level of the liquid refrigerant to obtain the two-phase refrigerant utilizing the expansion valve. The method further includes routing the two-phase refrigerant from the expansion valve to the inlet port of the cooling fin.

DETAILED DESCRIPTION

Figure 1:
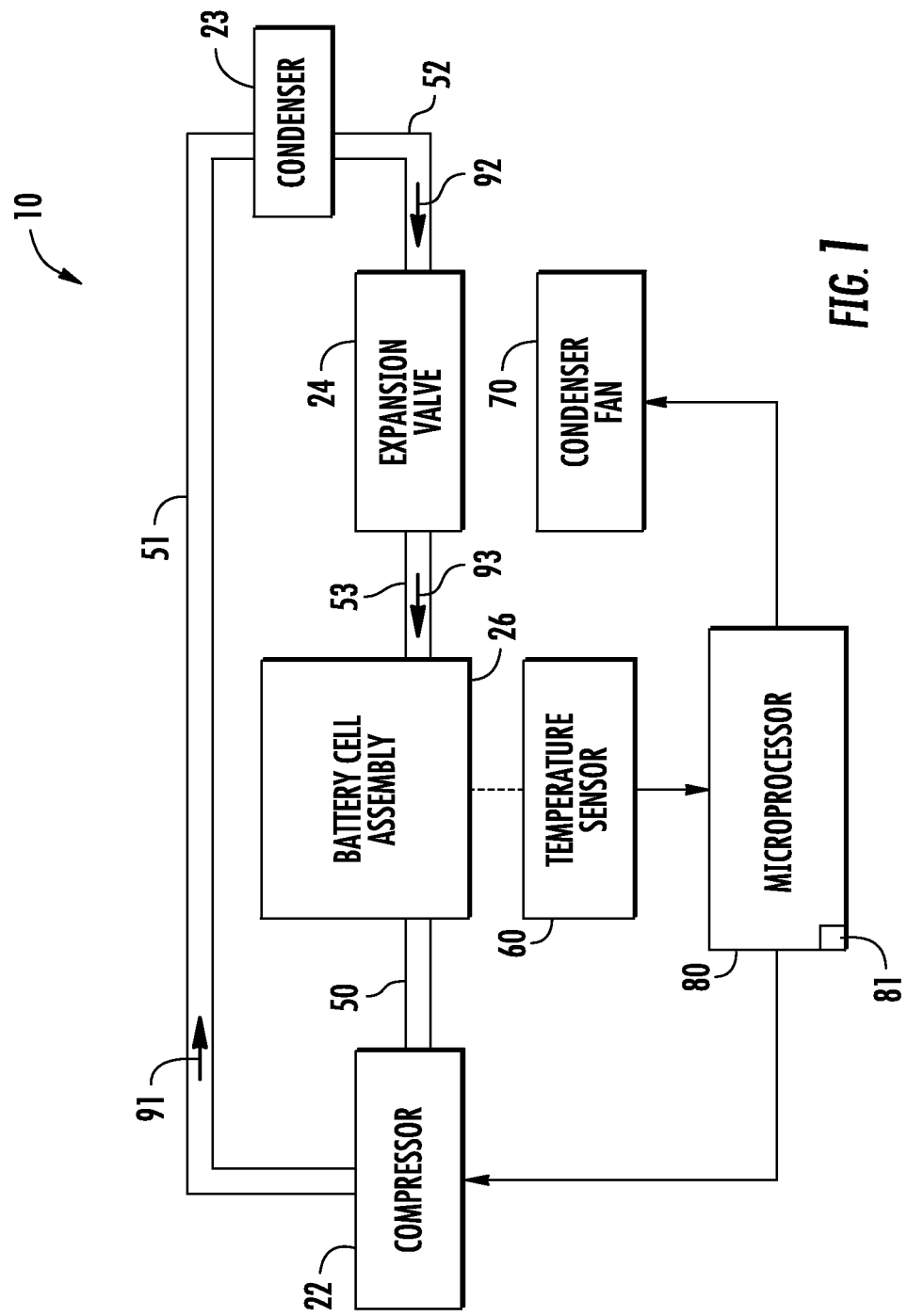
FIG. 1 is a schematic of a battery system in accordance with an exemplary embodiment.
Figure 2:
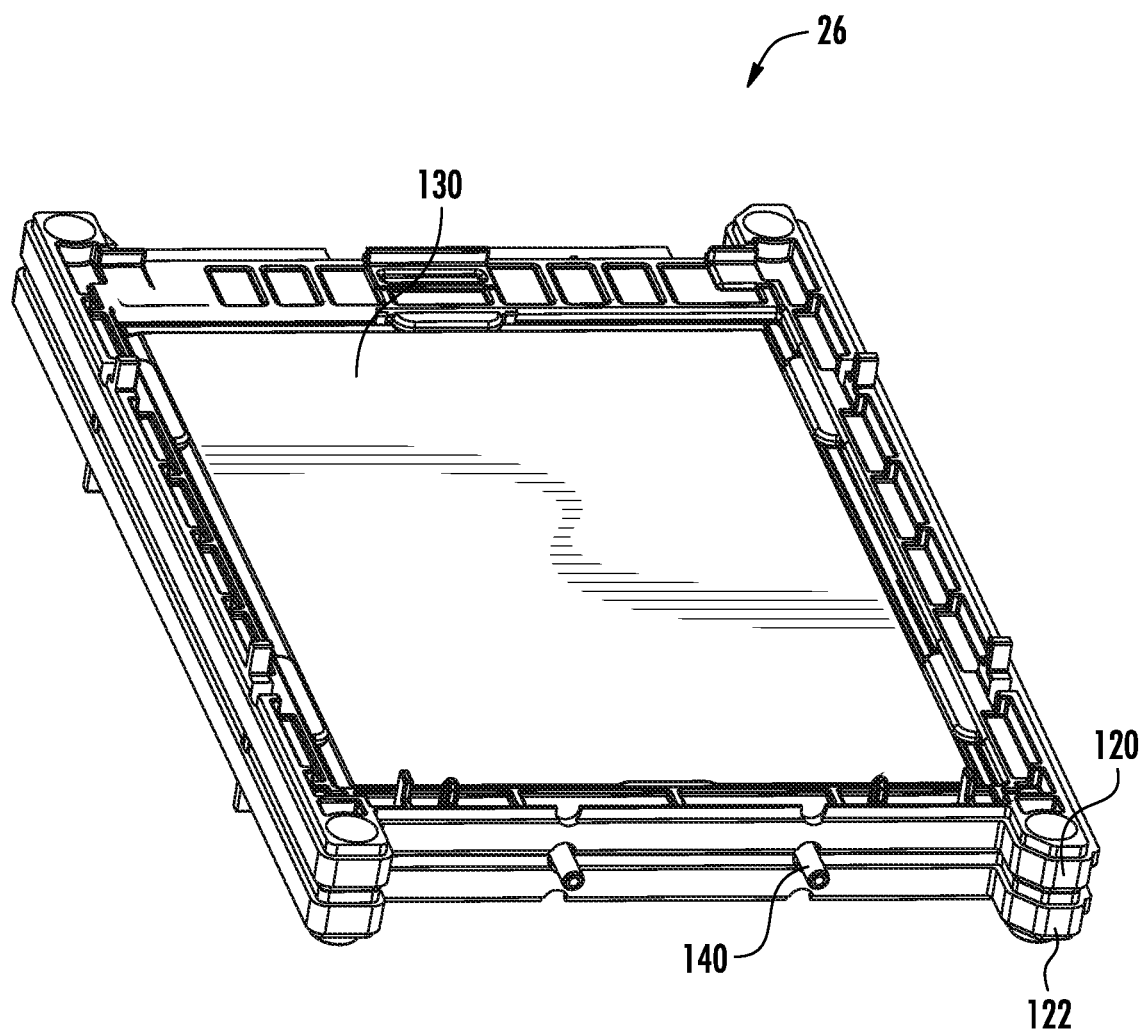
FIG. 2 is a schematic of a battery cell assembly utilized in the battery system of FIG. 1.

Referring to FIGS. 1-7, a battery system 10 for generating electrical power in accordance with an exemplary embodiment is illustrated. The battery system 10 includes a compressor 22, a condenser 23, an expansion valve 24, a battery cell assembly 26, conduits 50, 51, 52, 53, a temperature sensor 60, a condenser fan 70, and a microprocessor 80. An advantage of the battery system 10 is that the system 10 utilizes a cooling fin 140 disposed between adjacent battery cells that transitions a two-phase refrigerant to a gaseous refrigerant to cool the battery cells as will be explained in greater detail below.

For purposes of understanding, the term "refrigerant" corresponds to a substance that can reversibly transition between a liquid and a gas in a heat cycle. Exemplary refrigerants include R-11, R-12, R-122, R-134A, R-1407C and R-410A. Also, the term "gaseous refrigerant" corresponds to a refrigerant having primarily a gaseous state. Further, the term "liquid refrigerant" corresponds to a refrigerant having primarily a liquid state. Also, the term "two-phase refrigerant" corresponds to a refrigerant having a portion thereof in a liquid state and a remaining portion thereof in a gaseous state.

The compressor 22 is configured to pump and compress a gaseous refrigerant 91 through the conduit 51 into the condenser 23 in response to a control signal from the microprocessor 80. As shown, the conduit 51 is fluidly coupled between the compressor 22 and the condenser 23.

The condenser 23 is provided to receive the gaseous refrigerant 91 from the compressor 22 via the conduit 51 and to transition the gaseous refrigerant 91 into a liquid refrigerant 92 by extracting heat energy from the gaseous refrigerant 91. As shown, the conduit 52 is fluidly coupled between the condenser 23 and the expansion valve 24. After exiting the condenser 23, the liquid refrigerant 92 is further pumped through the conduit 52 to the expansion valve 24.

The expansion valve 24 is fluidly coupled between the condenser 23 and the battery cell assembly 26 via the conduits 52, 53. The expansion valve 24 is configured to receive the liquid refrigerant 92 from the condenser 23 and to decrease a pressure level of the liquid refrigerant 92 to obtain a two-phase refrigerant 93. The two-phase refrigerant 93 is routed from the expansion valve 24 to the conduit 182 of the battery cell assembly 26 via the conduit 53.

Referring to FIGS. 2-7, the battery cell assembly 26 in accordance with an exemplary embodiment is provided. The battery cell assembly 26 includes rectangular ring-shaped frame members 120, 122, battery cells 130, 132, and a cooling fin 140. An advantage of the battery cell assembly 26 is that the assembly 26 utilizes the cooling fin 140 disposed between adjacent battery cells 130, 132 that transitions the liquid refrigerant 92 into the gaseous refrigerant 93 to cool the battery cells 130, 132 as will be explained in greater detail below.

The rectangular ring-shaped frame members 120, 122 are configured to be coupled together to hold the battery cells 130, 132 and the cooling fin 140 therebetween. In one exemplary embodiment, the rectangular ring-shaped frame members 120, 122 are constructed of plastic. However, in alternative embodiments, the rectangular ring-shaped frame members 120, 122 could be constructed of other materials known to those skilled in the art.

The battery cells 130, 132 are each configured to generate an operational voltage. In one exemplary embodiment, each of the battery cells 130, 132 are pouch-type lithium-ion battery cells. Of course, other types of battery cells known to those skilled in the art could be utilized. Also, in an exemplary embodiment, the battery cells 130, 132 are electrically coupled in series to one another.

The battery cell 130 includes a rectangular-shaped pouch 150 and electrodes 152, 154 extending from the pouch 150. The battery cell 130 is disposed between the rectangular ring-shaped frame member 120 and the cooling fin 140.

The battery cell 132 includes a rectangular-shaped pouch 160, an electrode 162 and another electrode (not shown). The battery cell 132 is disposed between the rectangular ring-shaped frame member 122 and the cooling fin 140.

Referring to FIGS. 2-7, the cooling fin 140 is provided to transfer heat energy from the battery cells 130, 132 to the two-phase refrigerant 93 flowing through the cooling fin 140 to transition the two-phase refrigerant 93 into the gaseous refrigerant 91 within the cooling fin 140 to cool the battery cells 130, 132. The cooling fin 140 includes a generally rectangular-shaped aluminum plate 180 and a tube 112.

The rectangular-shaped aluminum plate 180 has a first side 190 and a second side 192. The plate 180 further includes first, second, third, and fourth peripheral edge portions 200, 202, 204, 206 (shown in FIG. 5) that are each arcuate-shaped to hold a portion of the tube 182 thereon. In other words, the first, second, third, and fourth peripheral edge portions 200, 202, 204, 206 define an arcuate-shaped groove 209 (shown in FIG. 6) configured to receive the tube 182 thereon. The first side 190 is sized to cover substantially all of a generally rectangular-shaped side surface of the battery cell 130. The second side 192 is sized to cover substantially all of a generally rectangular-shaped side surface of the battery cell 132.

Figure 5:
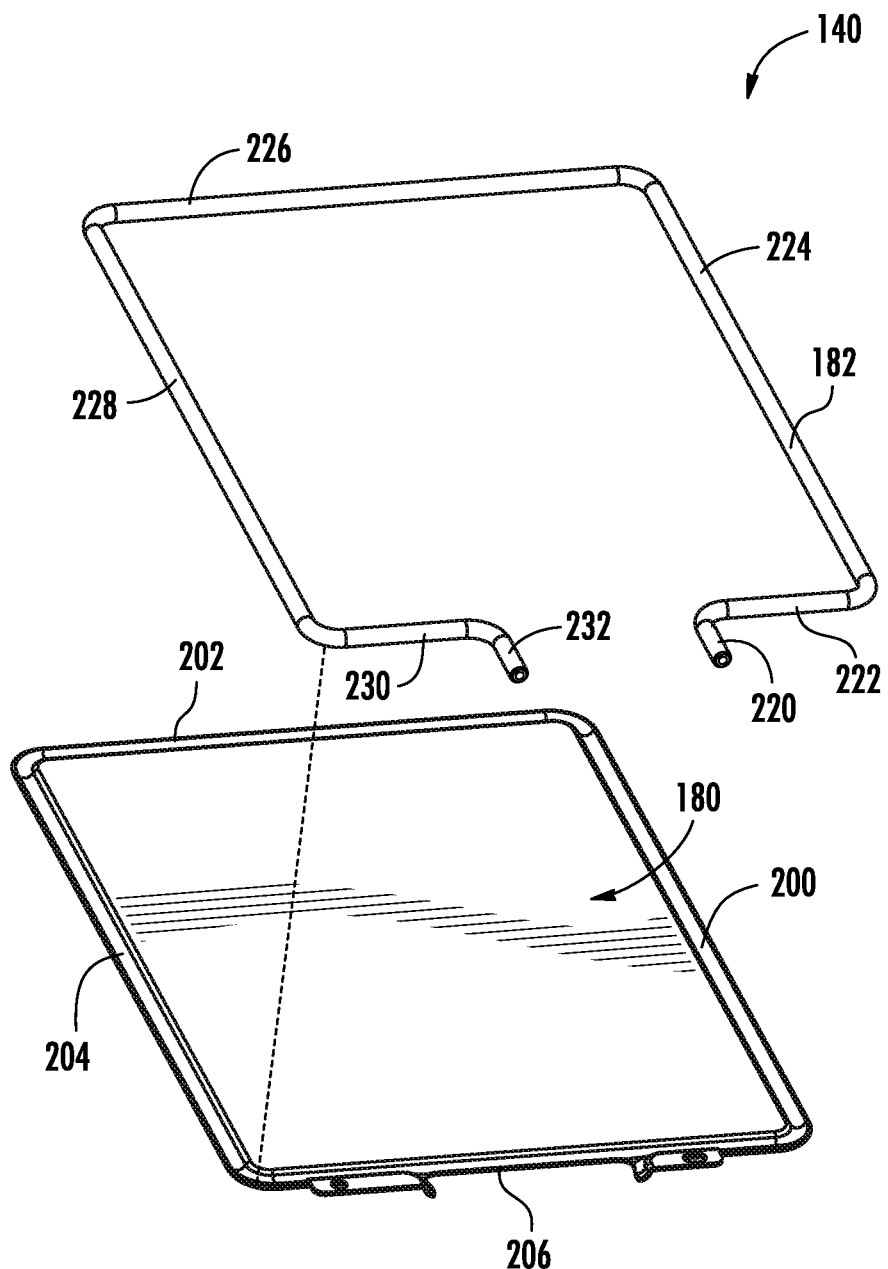
FIG. 5 is an exploded view of a cooling fin utilized in the battery cell assembly of FIG. 4.
Figure 6:
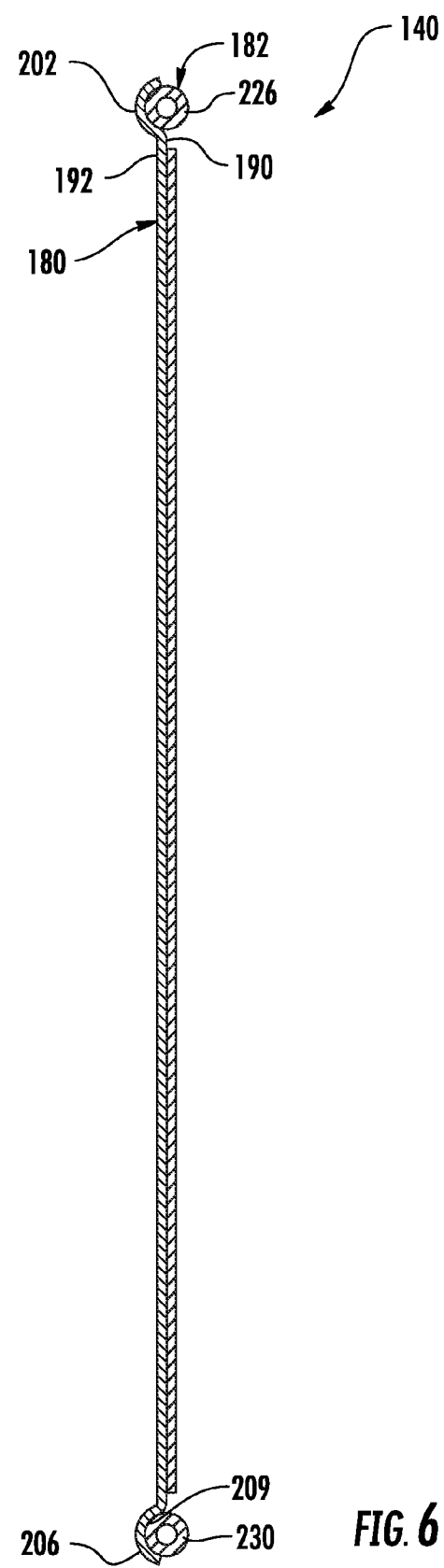
FIG. 6 is a cross-sectional view of a portion of the cooling fin of FIG. 4.
Figure 7:
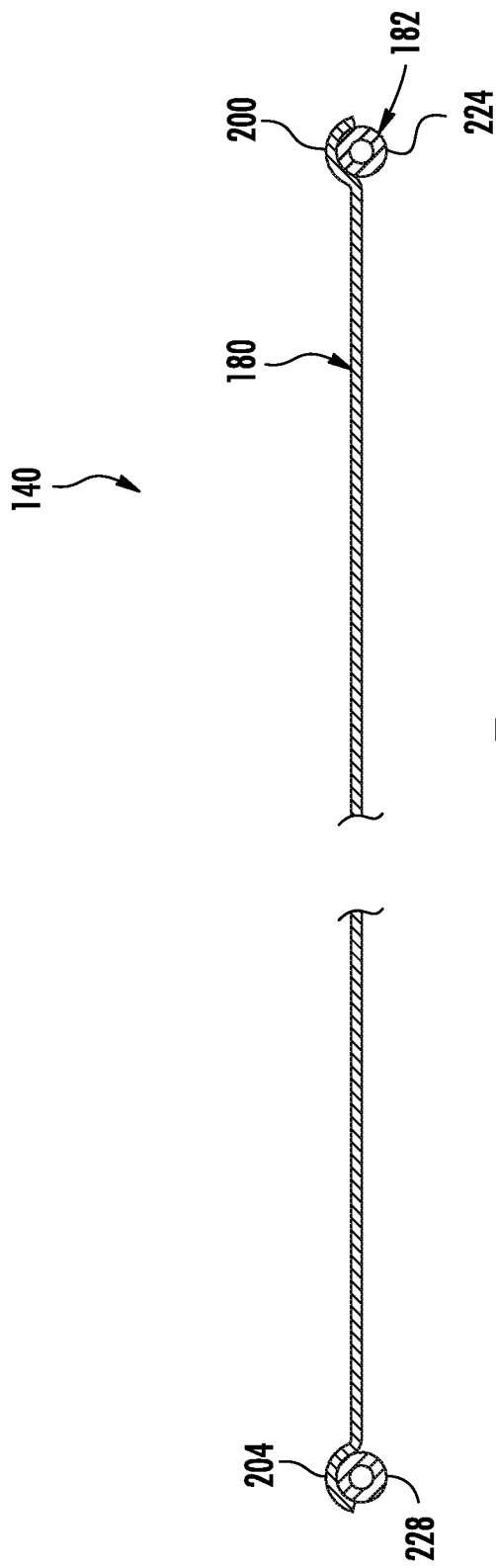
FIG. 7 is a cross-sectional view of another portion of the cooling fin of FIG. 4.
Figure 8:
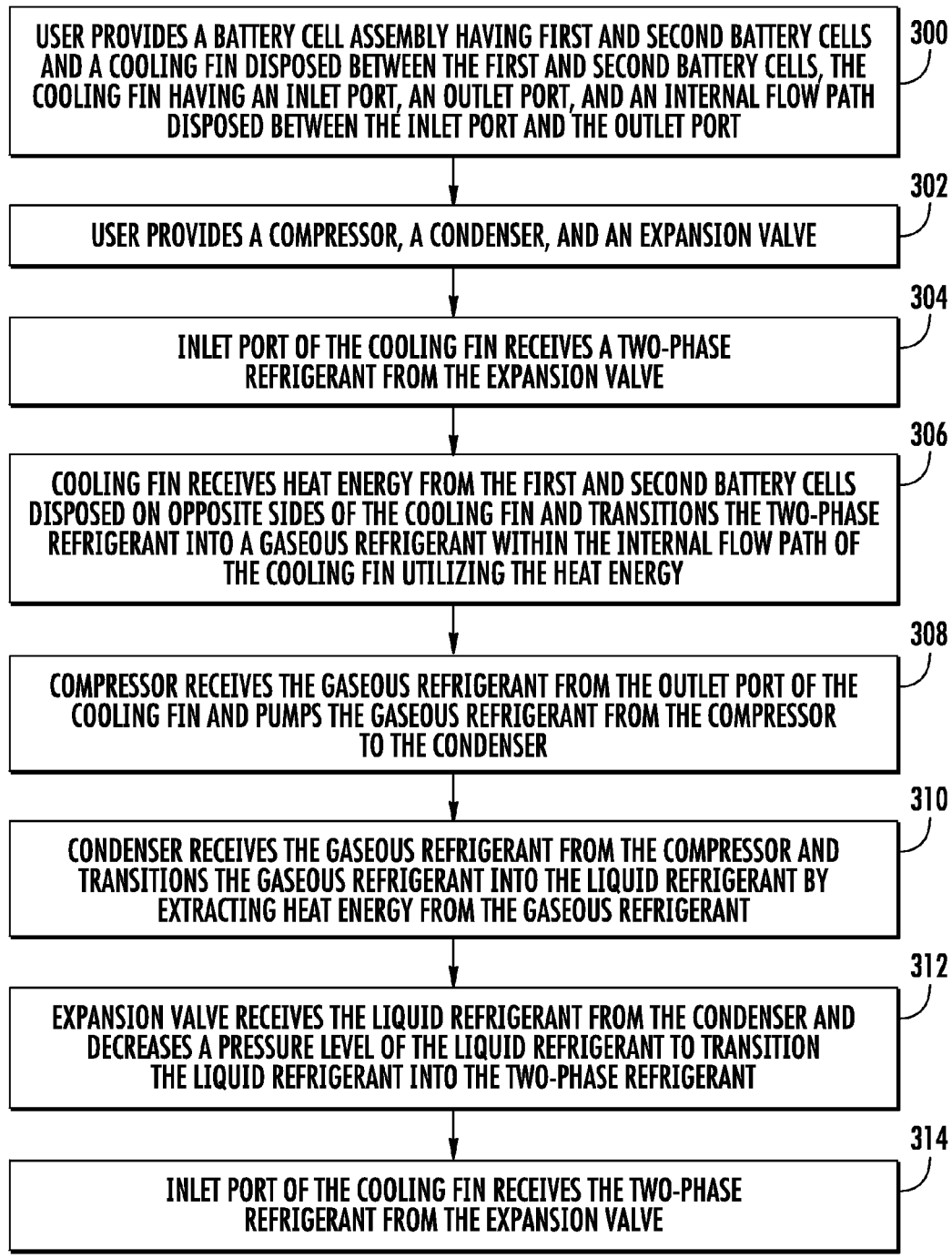
FIG. 8 is a flowchart of a method for cooling the battery cell assembly of FIG. 2 in accordance with another exemplary embodiment.

The tube 182 is coupled to the first side 190 of the generally rectangular-shaped aluminum plate 180, and is coupled to and extends on the first, second, third, and fourth peripheral edge portions 200, 202, 204, 206 of the plate 180. In one exemplary embodiment, the tube 182 is constructed of aluminum. However, the tube 182 could be constructed of other materials known to those skilled in the art. Referring to FIG. 5, the tube 182 includes an inlet port 220, tube portions 222, 224, 226, 228, 230, and an outlet port 232. The inlet port 220 is coupled to the tube portion 222, and is further coupled to the conduit 53. The tube portion 222 is coupled between the inlet port 220 and the tube portion 224. The tube portion 226 is coupled between the tube portion 224 and the tube portion 228. The tube portion 230 is coupled between the tube portion 228 and the outlet port 232. The outlet port 232 is further coupled to the conduit 50.

Also, referring to FIG. 5, the tube portion 222 is coupled to the fourth peripheral edge portion 206, and the tube portion 224 is coupled to the first peripheral edge portion 200, via brazing. The tube portion 226 is coupled to the second peripheral edge portion 202, and the tube portion 228 is coupled to the third peripheral edge portion 204, via brazing. Also, the tube portion 230 is coupled to the fourth peripheral edge portion 206 via brazing.

Figure 3:
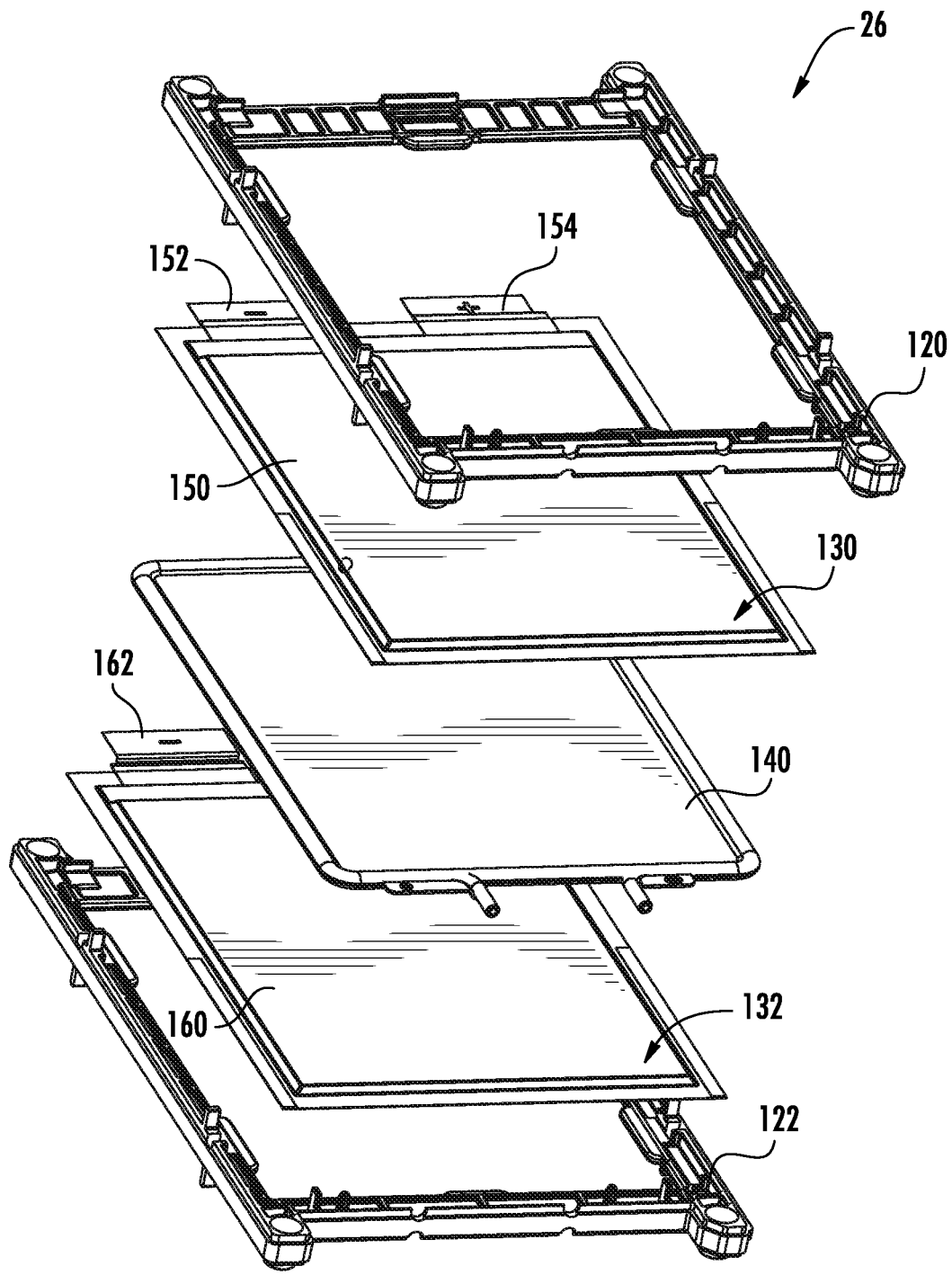
FIG. 3 is an exploded view of the battery cell assembly of FIG. 2.
Figure 4:
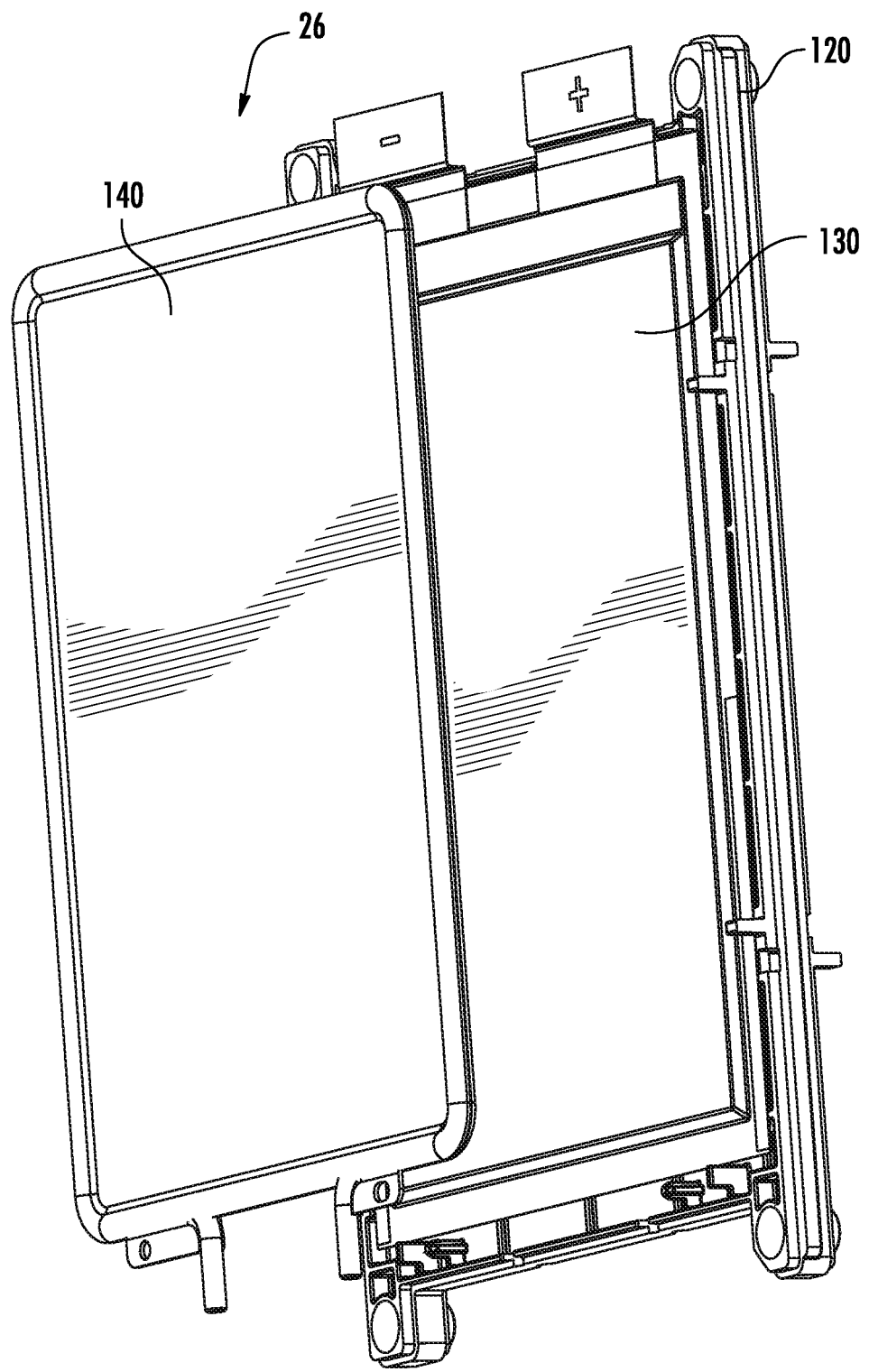
FIG. 4 is an exploded view of a portion of the battery cell assembly of FIG. 3.

Referring to FIGS. 3-5, during operation, the two-phase refrigerant 93 enters the inlet port 220 from the conduit 53. While flowing through at least some of the tube portions 212, 224, 226, 228, 213, the two-phase refrigerant 93 transitions into the gaseous refrigerant 91 and exits the outlet port 232. The outlet port 232 is coupled to the conduit 50. In particular, heat energy generated by the battery cell 130 is conducted through the rectangular-shaped aluminum plate 180 to the tube 182. Further, heat energy generated by the battery cell 132 is conducted through the rectangular-shaped aluminum plate 180 to the tube 182. Further, the heat energy in the tube 182 is conducted into the two-phase refrigerant 93 flowing through the internal flow path within the tube 182 and transitions the two-phase refrigerant 93 into the gaseous refrigerant 91 to reduce a temperature of the battery cell 130, 132.

Referring to FIG. 1, the temperature sensor 60 is provided to generate a signal indicative of a temperature level of the battery cells 130, 132 that is received by the microprocessor 80.

The condenser fan 70 is provided to blow air past the condenser 23 to cool the condenser 23 in response to a control signal from the microprocessor 80. As shown, the condenser fan 70 is disposed proximate to the condenser 23.

The microprocessor 80 is provided to control operation of the battery system 10. In particular, the microprocessor 80 is configured to generate control signals for controlling operation of the compressor 22 and the condenser fan 70 in response to a signal from the temperature sensor 60. In particular, the microprocessor 80 is configured to generate control signals to activate the compressor 22 and the condenser fan 70 if a temperature level of the battery cells 130, 132 is greater than a threshold temperature level. The microprocessor 80 utilizes a memory device 81 that stores software instructions and associated data for controlling the compressor 22 and the condenser fan 70. Thus, the microprocessor 80 is programmed to control the compressor 22 and the condenser fan 70 as described herein.

Referring to FIGS. 1, 3, 5 and 8, a flowchart of a method for cooling the battery cell assembly 26 in accordance with another exemplary embodiment will now be explained.

At step 300, a user provides the battery cell assembly 26 having the battery cells 130, 132 and the cooling fin 140 disposed between the battery cells 130, 132. The cooling fin 140 has the inlet port 220, the outlet port 232, and an internal flow path disposed between the inlet port 220 and the outlet port 232.

At step 302, the user provides the compressor 22, the condenser 23, and the expansion valve 24.

At step 304, the inlet port 220 of the cooling fin 140 receives the two-phase refrigerant 93 from the expansion valve 24.

At step 306, the cooling fin 140 receives heat energy from the battery cells 130, 132 disposed on opposite sides of the cooling fin 140 and transitions the two-phase refrigerant 93 into the gaseous refrigerant 91 within the internal flow path of the cooling fin 140 utilizing the heat energy.

At step 308, the compressor 22 receives the gaseous refrigerant 91 from the outlet port 232 of the cooling fin 140 and pumps the gaseous refrigerant 91 from the compressor 22 to the condenser 23.

At step 310, the condenser 23 receives the gaseous refrigerant 91 from the compressor 22 and transitions the gaseous refrigerant 91 into the liquid refrigerant 92 by extracting heat energy from the gaseous refrigerant 91.

At step 312, the expansion valve 24 receives the liquid refrigerant 92 from the condenser 23 and decreases a pressure level of the liquid refrigerant 92 to transition the liquid refrigerant 92 into the two-phase refrigerant 93.

At step 314, the inlet port 220 of the cooling fin 140 receives the two-phase refrigerant 93 from the expansion valve 24.

The battery cell assembly 26 and the method for cooling battery cells provide a substantial advantage over other battery cell assemblies and methods. In particular, the battery cell assembly 26 and the method provide a technical effect of utilizing a cooling fin disposed between adjacent battery cells that transitions a two-phase refrigerant into a gaseous refrigerant to effectively cool the battery cells.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery system, comprising:
   a battery cell assembly having first and second battery cells and a cooling fin disposed between the first and second battery cells;
   the cooling fin having a generally rectangular-shaped plate and a tube;
   the generally rectangular-shaped plate having a first side and a second side, the generally rectangular-shaped plate defining at least first, second, third, and fourth arcuate-shaped peripheral edge portions;
   the tube being coupled to the first side of the generally rectangular-shaped plate, the tube being disposed on the first, second, third, and fourth arcuate-shaped peripheral edge portions in an arcuate-shaped groove defined by the first, second, third, and fourth arcuate-shaped peripheral edge portions; the tube defining an internal flow path therein, the cooling fin configured to receive a two-phase refrigerant in the tube, the two-phase refrigerant having a portion thereof in a liquid state and a remaining portion thereof in a gaseous state, the cooling fin further configured to receive heat energy from the first and second battery cells and to transition the two-phase refrigerant into a gaseous refrigerant within the internal flow path utilizing the heat energy;
   a compressor fluidly coupled to the tube and configured to pump the gaseous refrigerant into a condenser; and
   the condenser fluidly coupled to the compressor and configured to receive the gaseous refrigerant from the compressor, the condenser further configured to transition the gaseous refrigerant into a liquid refrigerant by extracting heat energy from the gaseous refrigerant; and
   an expansion valve fluidly coupled between the condenser and the tube of the cooling fin, the expansion valve configured to receive the liquid refrigerant from the condenser and to decrease a pressure level of the liquid refrigerant to obtain the two-phase refrigerant, the two-phase refrigerant being routed from the expansion valve to the tube of the cooling fin.

2. The battery system of claim 1, wherein the generally rectangular-shaped plate is constructed of aluminum and the tube is constructed of aluminum.

3. The battery system of claim 1, wherein the generally rectangular-shaped plate is sized to cover substantially all of a generally rectangular-shaped side surface of the first battery cell.

4. The battery cell assembly of claim 1, wherein the tube is configured to transfer at least a portion of the heat energy to the two-phase refrigerant flowing in the tube.

5. The battery cell assembly of claim 1, further comprising first and second rectangular ring-shaped frame members, the cooling fin and the first and second battery cells being disposed between the first and second rectangular ring-shaped frame members.

6. The battery cell assembly of claim 1, wherein the generally rectangular-shaped plate has a substantially uniform thickness between the first side and the second side.

7. A method for cooling a battery cell assembly, the battery cell assembly having first and second battery cells, the method comprising:
   disposing a cooling fin between the first and second battery cells, the cooling fin having a generally rectangular-shaped plate and a tube; the generally rectangular-shaped plate having a first side and a second side, the generally rectangular-shaped plate defining at least first, second, third, and fourth arcuate-shaped peripheral edge portions; the tube being coupled to the first side of the generally rectangular-shaped plate, the tube being disposed on the first, second, third, and fourth arcuate-shaped peripheral edge portions in an arcuate-shaped groove defined by the first, second, third, and fourth arcuate-shaped peripheral edge portions; the tube defining an internal flow path therein;
   receiving a two-phase refrigerant in the tube of the cooling fin, the two-phase refrigerant having a portion thereof in a liquid state and a remaining portion thereof in a gaseous state;
   receiving heat energy in the cooling fin from the first and second battery cells disposed on opposite sides of the cooling fin and transitioning the two-phase refrigerant into a gaseous refrigerant within the internal flow path of the cooling fin utilizing the heat energy;
   routing the gaseous refrigerant from the tube to a compressor;
   pumping the gaseous refrigerant from the compressor to a condenser utilizing the compressor;
   transitioning the gaseous refrigerant received by the condenser into a liquid refrigerant by extracting heat energy from the gaseous refrigerant utilizing the condenser;
   pumping the liquid refrigerant from the condenser to an expansion valve and decreasing a pressure level of the liquid refrigerant to obtain the two-phase refrigerant utilizing the expansion valve; and
   routing the two-phase refrigerant from the expansion valve to the tube of the cooling fin.

* * * * *